(12) United States Patent
Axe et al.

(10) Patent No.: US 7,172,087 B1
(45) Date of Patent: Feb. 6, 2007

(54) SQUEEZABLE CONTAINER AND METHOD OF MANUFACTURE

(75) Inventors: Timothy P. Axe, Pemberville, OH (US); Qiuchen Peter Zhang, Perrysburg, OH (US); Charles P. Simpson, Jr., Adrian, MI (US)

(73) Assignee: Graham Packaging Company, LP, York, PA (US)

( * ) Notice: Subject to any disclaimer, the term of this patent is extended or adjusted under 35 U.S.C. 154(b) by 310 days.

(21) Appl. No.: 10/664,372

(22) Filed: Sep. 17, 2003

(51) Int. Cl.
*B65D 1/02* (2006.01)
*B29C 49/00* (2006.01)
*B65D 23/10* (2006.01)

(52) U.S. Cl. .................. 215/382; 215/381; 215/384; 215/398; 220/666; 220/673; 220/675; 264/523

(58) Field of Classification Search ........ 215/382–384, 215/900, 381, 400, 398; 220/673, 666, 669, 220/671, 672; 264/523
See application file for complete search history.

(56) References Cited

U.S. PATENT DOCUMENTS

| | | | |
|---|---|---|---|
| 3,335,902 A | | 8/1967 | Javorik |
| 3,536,500 A | * | 10/1970 | Cleereman et al. ......... 426/130 |
| D238,552 S | | 1/1976 | Edwards |
| 4,170,622 A | * | 10/1979 | Uhlig .................. 264/520 |
| 4,274,548 A | * | 6/1981 | Schneider .................. 220/675 |
| 4,497,855 A | | 2/1985 | Agrawal et al. |
| 4,512,490 A | * | 4/1985 | Frei et al. ............... 220/573 |
| 4,790,361 A | * | 12/1988 | Jones et al. .............. 220/666 |
| 4,804,083 A | * | 2/1989 | Weeks ................... 206/216 |
| D315,869 S | | 4/1991 | Collette |
| 5,005,716 A | | 4/1991 | Eberle |
| 5,067,622 A | | 11/1991 | Garver et al. |
| 5,080,244 A | * | 1/1992 | Yoshino .................. 215/375 |
| 5,092,475 A | * | 3/1992 | Krishnakumar et al. ..... 215/381 |
| 5,122,327 A | | 6/1992 | Spina et al. |

(Continued)

FOREIGN PATENT DOCUMENTS

EP 0 423 406 A1 4/1991

(Continued)

OTHER PUBLICATIONS

"Energy Water" Container Pictures.

(Continued)

*Primary Examiner*—Sue A. Weaver
(74) *Attorney, Agent, or Firm*—Venable LLP; James R. Burdett; Keith G. Haddaway

(57) ABSTRACT

A plastic container includes a finish, a shoulder extending from the finish, a closed base, and a sidewall connecting the shoulder to the base. The sidewall is of blow molded construction and generally uniform wall thickness. The sidewall has an array of circumferentially spaced longitudinally extending radially recessed channels, and an array of axially spaced circumferentially extending radially recessed channels intersecting the longitudinally extending channels. The longitudinally extending channels have radially inner portions that lie on an hourglass-shaped common surface of revolution around the axis of the container sidewall. In the preferred embodiments of the invention, a plurality of axially and circumferentially spaced land areas are disposed in spaces between the intersecting longitudinally and circumferentially extending channels, with the land areas lying on a common surface of revolution, preferably a cylindrical surface of revolution, around the axis of the container sidewall.

41 Claims, 4 Drawing Sheets

U.S. PATENT DOCUMENTS

| | | | |
|---|---|---|---|
| 5,201,438 A | 4/1993 | Norwood | |
| 5,255,808 A * | 10/1993 | Tobler | 220/6 |
| 5,279,433 A | 1/1994 | Krishnakumar et al. | |
| D345,105 S | 3/1994 | Ramsey | |
| 5,303,834 A | 4/1994 | Krishnakumar et al. | |
| 5,337,909 A | 8/1994 | Vailliencourt | |
| 5,341,946 A | 8/1994 | Vailliencourt | |
| D352,238 S | 11/1994 | Vailliencourt | |
| D352,245 S | 11/1994 | Krishnakumar et al. | |
| D358,766 S | 5/1995 | Vailliencourt et al. | |
| D364,565 S | 11/1995 | Vailliencourt et al. | |
| D366,831 S | 2/1996 | Semersky et al. | |
| D369,556 S | 5/1996 | Launder et al. | |
| D380,671 S | 7/1997 | Young | |
| 5,690,244 A | 11/1997 | Darr | |
| 5,704,503 A * | 1/1998 | Krishnakumar et al. | 215/381 |
| 5,704,504 A | 1/1998 | Bueno | |
| D393,802 S | 4/1998 | Collette et al. | |
| 5,762,221 A | 6/1998 | Tobias et al. | |
| D395,826 S | 7/1998 | Hygaard, Sr. | |
| D397,614 S | 9/1998 | Krishnakumar et al. | |
| D407,318 S | 3/1999 | Finlay et al. | |
| 5,902,526 A * | 5/1999 | Davis et al. | 264/40.1 |
| D411,740 S | 6/1999 | Kim | |
| 5,971,184 A * | 10/1999 | Krishnakumar et al. | 215/384 |
| 6,036,037 A | 3/2000 | Scheffer et al. | |
| D423,365 S | 4/2000 | Eberle et al. | |
| 6,044,996 A | 4/2000 | Carew et al. | |
| 6,062,409 A | 5/2000 | Eberle | |
| 6,068,161 A * | 5/2000 | Soehnlen et al. | 222/143 |
| D427,905 S | 7/2000 | Eberle | |
| 6,095,360 A * | 8/2000 | Shmagin et al. | 215/382 |
| D430,493 S | 9/2000 | Weick | |
| 6,112,925 A * | 9/2000 | Nahill et al. | 215/382 |
| D434,332 S | 11/2000 | Sir | |
| D434,664 S | 12/2000 | Bretz et al. | |
| D435,795 S | 1/2001 | Bretz et al. | |
| 6,213,326 B1 * | 4/2001 | Denner et al. | 215/383 |
| 6,223,920 B1 | 5/2001 | Lane et al. | |
| 6,230,912 B1 | 5/2001 | Rashid | |
| D453,094 S | 1/2002 | Maggard et al. | |
| 6,347,717 B1 | 2/2002 | Eberle | |
| 6,375,025 B1 | 4/2002 | Mooney | |
| D457,067 S | 5/2002 | Martynov et al. | |
| 6,439,413 B1 | 8/2002 | Prevot et al. | |
| 6,467,639 B2 | 10/2002 | Mooney | |
| D466,819 S | 12/2002 | Darr et al. | |
| 6,752,284 B1 * | 6/2004 | Akiyama et al. | 215/379 |
| 6,779,673 B2 * | 8/2004 | Melrose et al. | 215/381 |
| 6,841,262 B1 * | 1/2005 | Beck et al. | 428/542.8 |
| D502,109 S * | 2/2005 | Hutter et al. | D9/538 |
| 2001/0008593 A1 * | 7/2001 | Tsuji et al. | 399/262 |
| 2001/0030166 A1 | 10/2001 | Ozawa et al. | |
| 2001/0054597 A1 | 12/2001 | Ozawa et al. | |
| 2002/0008077 A1 | 1/2002 | Lane et al. | |
| 2002/0104820 A1 | 8/2002 | Hong et al. | |
| 2002/0148841 A1 | 10/2002 | Elich et al. | |
| 2003/0000911 A1 | 1/2003 | Kelley et al. | |
| 2003/0010743 A1 | 1/2003 | Boukobza | |
| 2003/0015491 A1 | 1/2003 | Melrose et al. | |
| 2003/0121881 A1 * | 7/2003 | Higuchi | 215/381 |
| 2004/0164047 A1 | 8/2004 | White | |

FOREIGN PATENT DOCUMENTS

| | | |
|---|---|---|
| EP | 0 506 065 A1 | 9/1992 |
| WO | WO 01/89934 | 11/2001 |

OTHER PUBLICATIONS

Design U.S. Appl. No. 29/176,695, filed Feb. 25, 2003.

* cited by examiner

SQUEEZABLE CONTAINER AND METHOD OF MANUFACTURE

The present invention is directed to containers of a type adapted to be radially compressed or squeezed by a user to dispense product from the container, and to a method of making such a the container.

BACKGROUND AND SUMMARY OF THE INVENTION

It is a general object of the present invention to provide a container with a body of blow-molded plastic construction, and a method of making such a container, having a sidewall that is contoured and constructed to be readily ergonomically squeezable for maximizing the dispensing of either hot-filled, or cold-filled liquid product.

A plastic container in accordance with one aspect of the present invention includes a finish, a shoulder extending from the finish, a closed base, and a sidewall connecting the shoulder to the base. The sidewall is of blow molded construction and generally uniform wall thickness. The sidewall has an array of circumferentially spaced longitudinally extending radially recessed channels, and an array of axially spaced circumferentially extending radially recessed channels intersecting the longitudinally extending channels. The longitudinally extending channels have radially inner portions that lie on an hourglass-shaped common surface of revolution around the axis of the container sidewall. In accordance with a second aspect of the preferred embodiments of the invention, a plurality of axially and circumferentially spaced land areas are disposed in spaces between the intersecting longitudinally and circumferentially extending channels, with the land areas lying on a common surface of revolution, preferably a cylindrical surface of revolution, around the axis of the container sidewall.

BRIEF DESCRIPTION OF THE DRAWINGS

The invention, together with additional objects, features, advantages and aspects thereof, will be best understood from the following description, the appended claims and the accompanying drawings, in which:

DETAILED DESCRIPTION OF PREFERRED EMBODIMENTS

Figure 1:
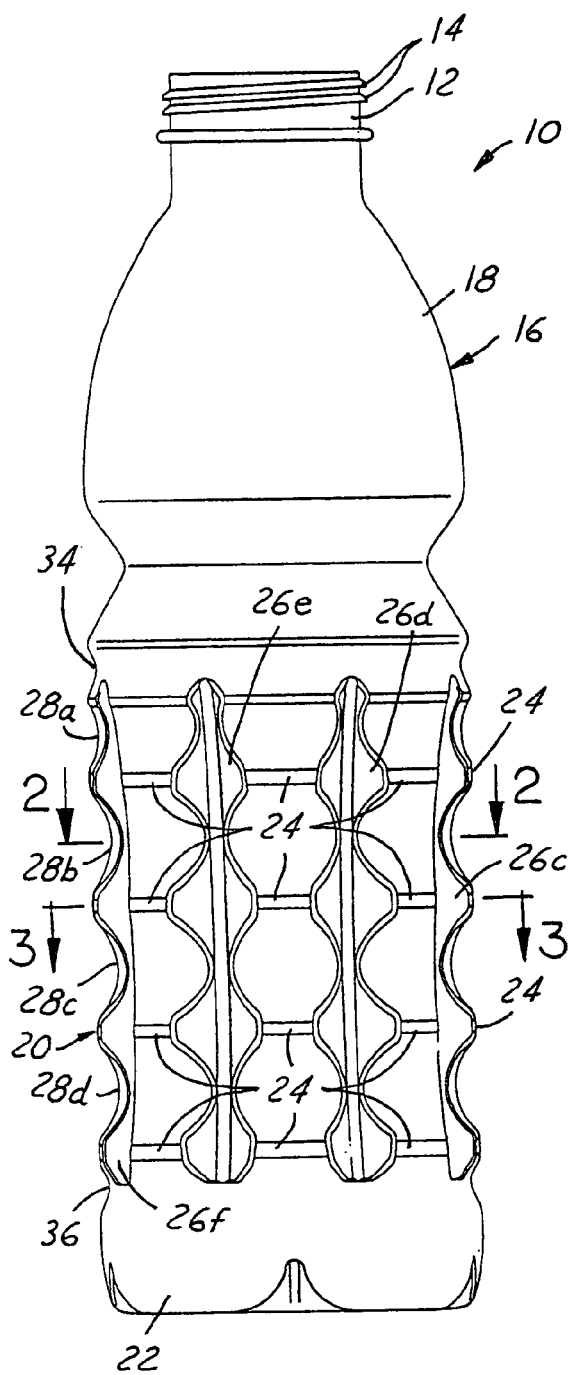
FIG. 1 is a side elevational view of a container in accordance with one exemplary embodiment of the invention.
Figure 2:
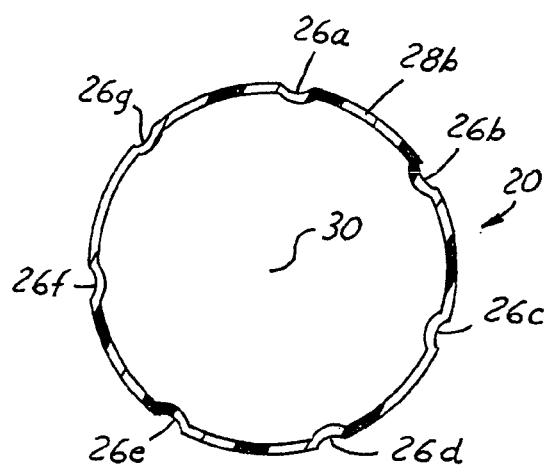
FIGS. 2 and 3 are sectional views taken substantially along the respective lines 2—2 and 3—3 in FIG. 1.
Figure 3:
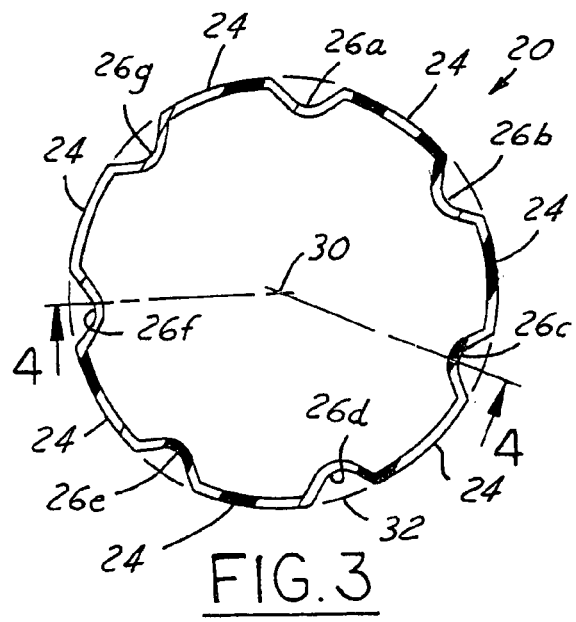

FIGS. 1–4 illustrate a one-piece integrally molded container 10 in accordance with one presently preferred embodiment of the invention. Container 10 preferably includes a finish 12, which preferably has one or more external threads or beads 14 for securing a dispensing closure to the container finish. A container body 16 preferably includes a shoulder or dome 18 that extends from the lower end of finish 12. (Direction words such as "upper" and "lower" are employed by way of description and not limitation with respect to the upright orientation of the containers illustrated in FIGS. 1, 4 and 5. Directional words such as "axial" and "radial" are employed by way of description and not limitation with respect to the axis of the container sidewall, which preferably although not necessarily is concentric with the axes of the container finish, shoulder and base.) A container sidewall 20 interconnects the lower edge of shoulder 18 with a closed container base or bottom 22. Finish 12, shoulder 16 and base 22 may be of any suitable construction, with the geometries illustrated in the drawings being exemplary. The present invention deals primarily with the construction of container sidewall 20.

Referring to FIGS. 1–4, container sidewall 20 includes a plurality of arcuate land areas 24 defined between a plurality of longitudinally extending circumferentially spaced radially inwardly recessed container sidewall grooves or channels 26a–26g, and a plurality of axially spaced continuous circumferentially extending radially inwardly recessed container sidewall grooves or channels 28a–28d. Land areas 24 preferably are rectangular as viewed in side elevation (FIG. 1), and have outer surfaces that lie on a common surface of revolution 32 around an axis 30 (FIGS. 3 and 4) of container sidewall 20, preferably a cylindrical surface of revolution. (Reference to a "common" surface of revolution means that all of the referenced structures, in this case the outer surfaces of land areas 24, lie on a single shared surface of revolution.) Longitudinal channels 26a–26g and circumferential channels 28a–28d cross or intersect at surface of resolution 32 to form land areas 24.

Figure 4:
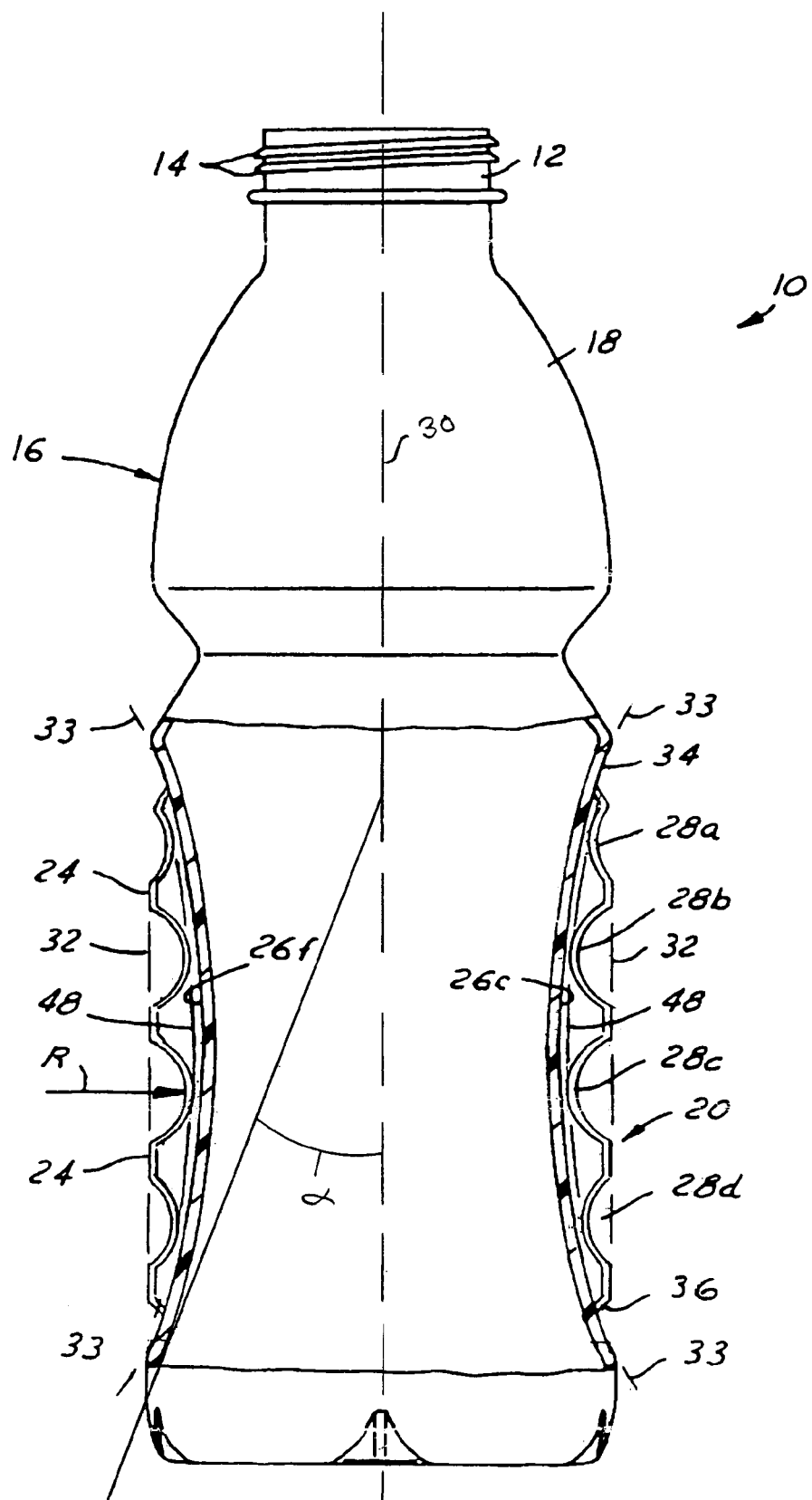
FIG. 4 is a fragmentary sectional view taken substantially along the line 4—4 in FIG. 3.

Longitudinally extending circumferentially spaced channels 26a–26g preferably are identical to each other and uniformly angularly spaced around sidewall axis 30. As best seen in FIG. 4, the radially inner portions of the several longitudinal channels 26a–26g lie on an hourglass-shaped common surface of revolution 33 around sidewall axis 30. This surface of revolution curves continuously in the preferred embodiments of the invention from the upper end of sidewall 20 where the sidewall connects with shoulder 18 to the lower end of sidewall 20 where the sidewall connects with container base 22. The minimum diameter or waist of hourglass-shaped surface of revolution 33 preferably is about halfway between the upper and lower ends of the sidewall, although this can vary for containers of differing geometries. Hourglass-shaped surface of revolution 33 can have other than continuously curving geometries, such as a geometry in which the upper and lower end portions are substantially conical and are interconnected by a curved waist. The outline of the hourglass-shaped geometry can be symmetrical or non-symmetrical, such as by placing the waist well above or below the midpoint of the sidewall. The preferred embodiment illustrated in FIG. 4 is slightly asymmetrical in that, while the mid portion of surface 33 is at constant radius, the upper and lower end portions are at differing non-constant radii. As viewed from the axial direction (FIGS. 2 and 3), longitudinal channels 26a–26g may be of any suitable geometry, such as substantially V-shaped as shown in the drawings, or curving at either constant or varying radius of curvature. The radially inner portions of longitudinal channels 26a–26g may be sharp or have small radii of curvature, or more preferably may possess large radii of curvature or even be substantially flat. Longitudinal channels 26a–26g are uniformly spaced from to each other, and may be at an angle to sidewall axis 30 of 0° to 30°. For example, as shown in FIG. 4, the lowermost portion of longitudinal channel 26f is at an angle α with respect to the axis 30. In the preferred embodiments illustrated in the drawings, longitudinal channels 26a–26g (or 26a–26h in FIGS. 5–7) are identical, and each longitudinal channel is substantially co-planar with the sidewall axis 30. For example, FIGS. 3 and 4 together show longitudinal channels 26c and 26f being co-planar with the axis 30.

Figure 8A:
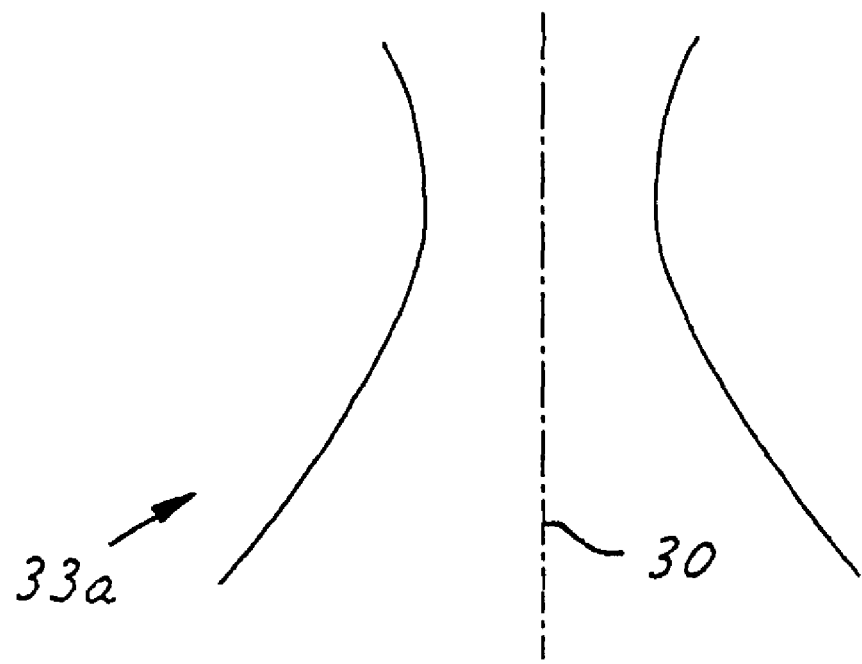
FIGS. 8A and 8B are schematic illustrations of respective alternative hourglass-shaped surfaces of revolution.
Figure 8B:
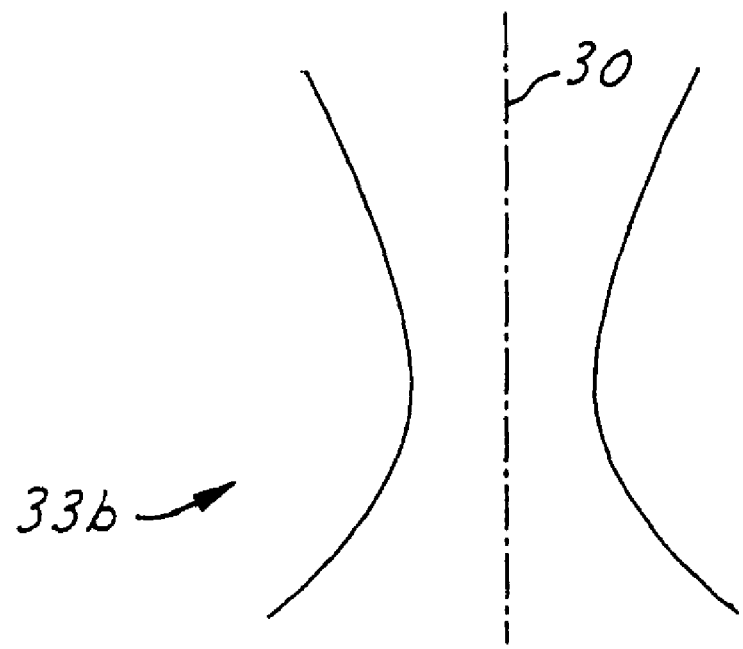

Circumferentially extending channels 28a–28d have central planes that are parallel to each other and perpendicular to sidewall axis 30. Channels 28a–28d preferably have identical uniform radii of curvature R (FIG. 4). The radial depth of channels 28a–28d vary with axial position along sidewall 20, as best seen in FIG. 1, and as a function of the depth of the longitudinal channels 26a–26g. That is, circumferential channels 28a–28d have a radial depth that is equal to or, preferably, slightly less than the radial depth of the longitudinal channels at the axial position of each circumferential channel. Thus, as best seen in FIG. 1, circumferentially extending channel 28a has the least radial depth and axial dimension, while circumferentially extending channel 28c has the greatest radial depth and axial dimension. As noted above, and as best seen in FIG. 2, the radial depth of circumferential channels 28a–28d preferably is slightly less than the radial depth of longitudinal channels 26a–26g. FIGS. 8A and 8B are schematic drawings of respective exemplary alternative hourglass-shaped surfaces of revolution 33a and 33b.

Circumferential channels 28a–28d (or 28a–28e in FIG. 5) preferably have identical uniform radii of curvature R as noted above. However, these channels can be non-identical and/or have other than uniform radii of curvature, such as V-shaped channels. Container sidewall 20 preferably, but not necessarily, is separated from shoulder 18 by a continuous circumferentially extending channel 34 (FIG. 1), and from base 22 by a continuous circumferentially extending channel 36. Channels 34, 36 help isolate sidewall 20, which is designed for squeeze-dispensing of product from the container, from shoulder 18 and base 22 that are less flexible and squeezable.

Figure 5:
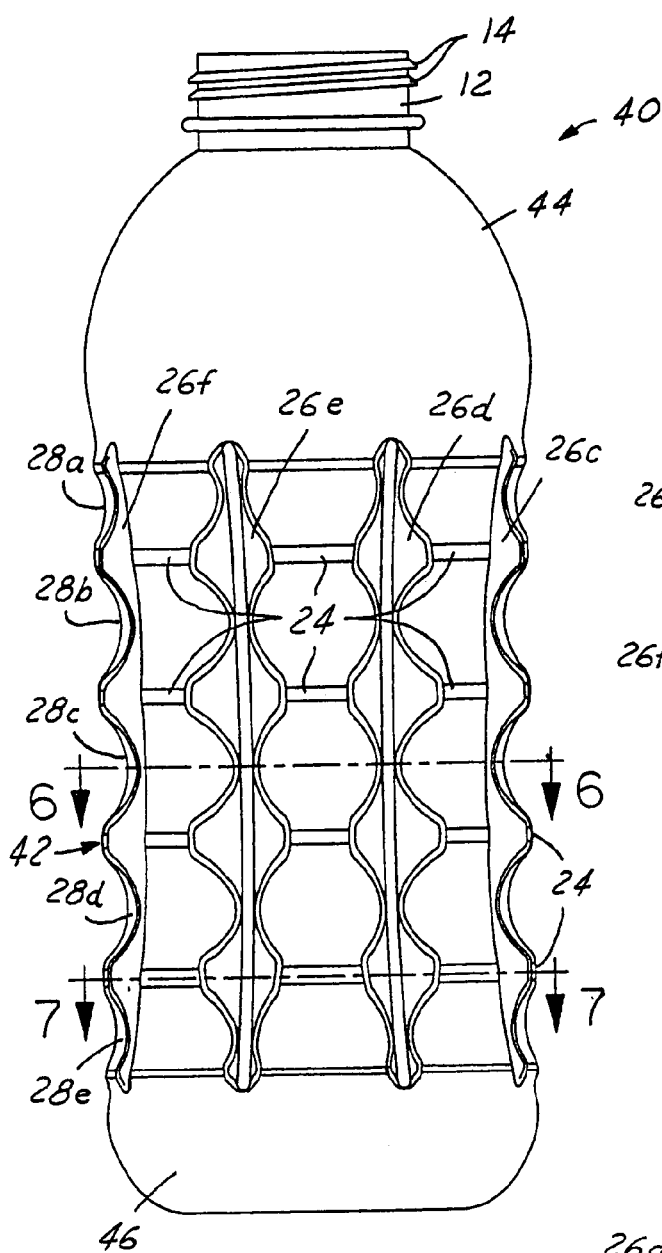
FIG. 5 is a side elevational view of a container in accordance with a second exemplary embodiment of the invention.
Figure 6:
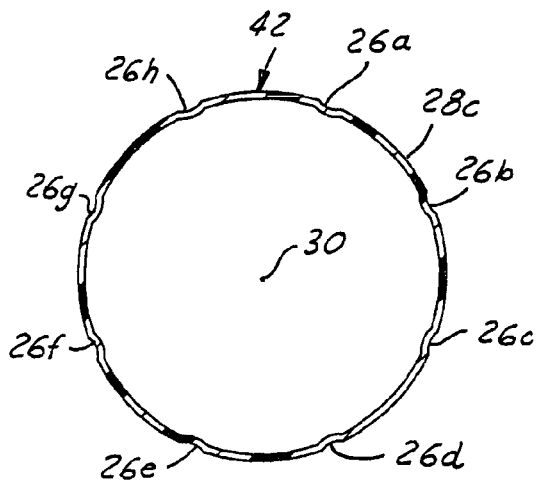
FIGS. 6 and 7 are sectional views taken substantially along the respective lines 6—6 and 7—7 in FIG. 5.
Figure 7:
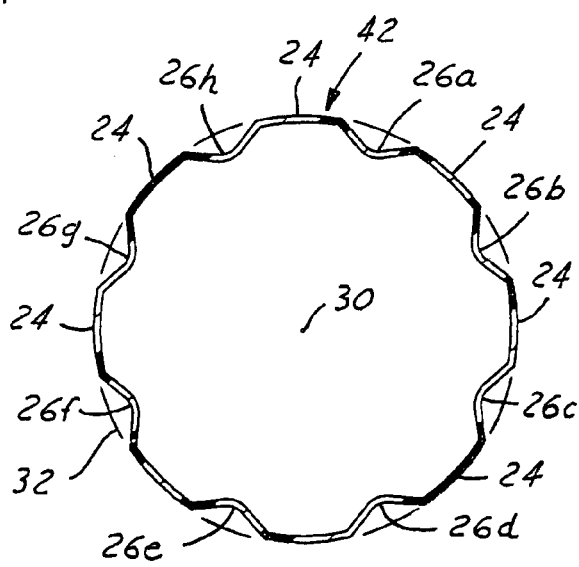

FIGS. 5–7 illustrate a container 40 in accordance with a second exemplary embodiment of the invention. Reference numerals in FIGS. 5–7 that are identical to those in FIGS. 1–4 indicate related elements. Container 40 has a sidewall 42 that extends between a shoulder 44 and a base 46. Sidewall 42 is similar to sidewall 20 in FIGS. 1–4, except there are eight longitudinally extending circumferentially spaced channels 26a–26h, and five circumferentially continuous axially spaced channels 28a–28e. The geometries of and relationships between the longitudinally extending and circumferentially extending channels in the embodiment of FIGS. 5–7 are the same as in the embodiment of FIGS. 1–4.

As noted above, surface of revolution 32 (FIGS. 3 and 4), on which land areas 24 lie, preferably is cylindrical around axis 30. However, surface of revolution 32 may have other geometries, such as hourglass-shaped or barrel-shaped. Indeed, surface of revolution 32 may be wavy as viewed in longitudinal cross section (FIG. 4). It is preferred that all land areas 24 at a given axial position be at the same radius, which is to say that the land areas preferably lie in a single common surface of revolution around axis 30.

A further common surface of revolution 48 (FIG. 4) preferably is defined by the inner portions of circumferential channels 28a–28d (or 28a–28e in FIG. 5). Surface of revolution 48 preferably is hourglass-shaped, and preferably closely tracks and is spaced radially outwardly from surface of revolution 33. However, surface fo revolution 48 might contact surface of revolution 33, and indeed may be congruent with surface of revolution 33. Furthermore, surface of revolution 48 may be non-hourglass-shaped if desired.

Containers and sidewalls in accordance with the present invention can be fabricated by any suitable blow molding technique. The containers preferably are fabricated in a two stage operation by blow molding preforms, which are themselves injection or compression molded. The containers alternatively can be formed in a single stage injection stretch blow molding operation, or in an injection extrusion blow molding operation in which the finish is injection molded and a tube is extruded from the finish and blow molded to form the container body. In molding operations of these types, the container finish typically is injection or compression molded to its final configuration and is of relatively rigid construction, while the container body is blow molded after the finish is formed. The container also can be formed in an extrusion blow molding operation. Other container molding operations can be employed. For example, finish 12 with external threads 14 can be attached to the container body after blow molding the container body.

The container of the present invention can be of any suitable plastic construction, such as monolayer or multilayer polyester, polyethylene (e.g., HDPE) or polypropylene (PP). The containers preferably are of monolayer or multilayer polyethylene terephthalate (PET) construction. In multilayer containers, one or more intermediate layers are provided between inner and outer layers of PET construction, such as intermediate layers of active or passive barrier material (e.g., nylon or ethylene vinyl alcohol (EVOH)) to retard migration of gases through the container wall. The barrier layers may or may not extend into the finish of the container. The radial thickness of sidewall 20 or 42 preferably is substantially uniform around the sidewall—i.e., ignoring the slight thickness differences that result from differential expansion of the container sidewall during blow molding. In one current embodiment of the container illustrated in FIGS. 1–4, the wall thickness is 0.012 inch at the insides of longitudinally extending channels 26a–26g and 0.008 inch at land areas 24. In other words, there is a 0.004 inch difference in wall thicknesses in this example due to differential expansion of the sidewall material. The radial thickness of sidewall 20 or 42 preferably is substantially uniform and in the range of 0.005 to 0.03 inch. In an exemplary embodiment shown substantially to scale in FIGS. 1–4, sidewall 20 has a height of about 3.9 inches between channels 34, 36, radius R is about 0.6 inch. The radius of curvature of the mid portion of surface 33 is about eleven to twelve inches, and varies at the upper and lower ends as noted above.

After blow molding, container 10 or 40 is filled with liquid product and a dispensing closure is applied to container finish 12. A suitable slide-nozzle dispensing closure, for example, is illustrated in U.S. Pat. No. 5,303,834. To dispense product from the container, container sidewall 20 or 42 is gripped by a user, and is deformed or squeezed radially inwardly to increase the pressure within the container and thereby dispense product through the dispensing closure. Container sidewall 20 or 42 in accordance with the present invention is specifically contoured to be extremely squeezable for maximizing the dispensing of liquid from the container. When sidewall 20 or 42 is grasped by a user, the fingers of the user's hand naturally nestle within circumferentially extending channels 28a–28d or 28a–28e. The bases of longitudinally extending channels 26a to 26g or 26h naturally form lines of flexure during squeezing of the container sidewall. The portions of the container sidewall between longitudinally extending channels 26a–26g or 26h form vertical columns that provide top load strength to the container body. The container wall thus may be of reduced thickness without sacrificing either top load capability or squeeze-fatigue strength.

The container of the present invention is adapted for both cold-fill and hot-fill applications. In hot-fill applications, in which the container is filled with hot liquid product and then capped, an internal vacuum develops as the product cools. Container sidewall 20 or 42 may distort under the vacuum pressure within the container. The container sidewall may assume an oval geometry, or a triangular geometry with the corners of the triangle being randomly located at longitudinally extending channels 26a–26g or 26h. However, the fingers of a user will still naturally nestle within circumferential channels 28a–28d or 28e, so that the container can be readily squeezed to dispense product. Thus, the ergonomic wrap-around grip design of sidewalls 20, 42 is maintained in both hot-fill and cold-fill applications. Furthermore, in hot-fill applications, the contour of container sidewalls 20, 42 channels the vacuum forces around the container sidewall rather than attempting to provide sufficient resistance to prevent deformation, or to provide localized areas or panels for deformation, which reduces both the cost and the complexity of the sidewall design.

There have thus been disclosed a container, a container sidewall and a method of making a container that fully satisfy all of the objects and aims previously set forth. The invention has been disclosed in connection with two presently preferred embodiments thereof, and a number of modifications and variations have been discussed. Other modifications and variations will readily suggest themselves to persons of ordinary skill in the art. The invention is intended to embrace all such modifications and variations as fall within the spirit and broad scope of the appended claims.

The invention claimed is:

1. A squeezable plastic container that includes:
   a finish, a shoulder extending from said finish, a closed base, and a sidewall connecting said shoulder to said base,
   said sidewall being of blow molded construction and having an array of circumferentially spaced longitudinally extending radially recessed channels, and an array of axially spaced circumferentially extending radially recessed channels intersecting said longitudinally extending channels, said sidewall adapted to be squeezed radially inwardly,
   said longitudinally extending channels having radially inner portions that lie on an hourglass-shaped surface of revolution around an axis of said sidewall.

2. The container set forth in claim 1 wherein said hourglass-shaped surface of revolution curves continuously between said shoulder and said base.

3. The container set forth in claim 2 wherein said hourglass-shaped surface of revolution has a waist about halfway between said shoulder and said base.

4. The container set forth in claim 2 wherein said hourglass-shaped surface of revolution has a mid portion with a constant radius of curvature.

5. The container set forth in claim 1 wherein land areas between said longitudinally extending channels and said circumferentially extending channels lie on a cylinder of revolution around said axis.

6. The container set forth in claim 1 wherein said longitudinally extending channels are at an angle in the range of 0 to 30° to said axis.

7. The container set forth in claim 6 wherein said longitudinally extending channels are uniformly circumferentially spaced around said axis, and each of said longitudinally extending channels is substantially co-planar with said axis.

8. The container set forth in claim 6 wherein said circumferentially extending channels are parallel to each other and perpendicular to said axis, and are uniformly axially spaced from each other.

9. The container set forth in claim 1 wherein said circumferentially extending channels have radial depths as a function of axial position along said sidewall in coordination with radial depth of said radially inner portions of said longitudinally extending channels.

10. The container set forth in claim 9 wherein said circumferentially extending channels are concave at identical radii of curvature.

11. The container set forth in claim 1 wherein said radially inner portions of said longitudinally extending channels lie radially inwardly of radially inner portions of said circumferentially extending channels.

12. The container set forth in claim 1 wherein said sidewall is of monolayer or multilayer PET construction and has a sidewall thickness in the range of 0.005 to 0.03 inch.

13. A squeezable container of blow molded plastic construction that includes:
    a finish, a shoulder extending from said finish, a closed base and a sidewall connecting said shoulder to said base,
    said sidewall having an axis and a plurality of axially and circumferentially spaced land areas with outer surfaces on a surface of revolution around said axis, said sidewall adapted to be squeezed radially inwardly,
    said land areas being separated from each other by a plurality of circumferentially spaced channels and a plurality of axially spaced channels that intersect said circumferentially spaced channels,
    said land areas being disposed in spaces between said channels,
    said circumferentially spaced channels having radially inner portions that lie on an hourglass-shaped surface of revolution around said axis of said sidewall.

14. The container set forth in claim 13 wherein the surface of revolution on which the outer surfaces of said land areas reside is cylindrical.

15. The container set forth in claim 13 wherein said land areas are rectangular as viewed in side elevation.

16. The container set forth in claim 13 wherein said hourglass-shaped surface of revolution curves continuously between said shoulder and said base.

17. The container set forth in claim 16 wherein said hourglass-shaped surface of revolution has a waist about halfway between said shoulder and said base.

18. The container set forth in claim 16 wherein said hourglass-shaped surface of revolution has a mid portion with a constant radius of curvature.

19. The container set forth in claim 13 wherein said circumferentially extending channels have radial depths as a function of axial position along said sidewall in coordination with radial depth of said radially inner portions of said longitudinally extending channels.

20. The container set forth in claim 13 wherein said radially inner portions of said circumferentially spaced channels lie radially inwardly of radially inner portions of said axially spaced channels.

21. The container set forth in claim 13 wherein said sidewall is of monolayer or multilayer PET construction and has a sidewall thickness in the range of 0.005 to 0.03 inch.

22. A squeezable container of blow-molded plastic construction that includes:
a finish, a shoulder extending from said finish, a closed bottom and a sidewall connecting said shoulder to said bottom,
said sidewall having an array of circumferentially spaced longitudinally extended channels and an array of axially spaced circumferentially extending channels intersecting said longitudinally extending channels, said sidewall adapted to be squeezed radially inwardly,
said longitudinally extending channels and said circumferentially extending channels having radially inner portions at differing radii with respect to an axis of the sidewall.

23. The container set forth in claim 22 wherein said longitudinally extending channels having radially inner portions that lie on an hourglass-shaped surface of revolution around an axis of said sidewall.

24. The container set forth in claim 23 wherein said hourglass-shaped surface of revolution curves continuously between said shoulder and said base.

25. The container set forth in claim 24 wherein said hourglass-shaped surface of revolution has a waist about halfway between said shoulder and said base.

26. The container set forth in claim 23 wherein said circumferentially extending channels have radial depths as a function of axial position along said side wall in coordination with radial depth of said radially inner portions of said longitudinally extending channels.

27. The container set forth in claim 26 wherein said circumferentially extending channels are concave at identical radii of curvature.

28. The container set forth in claim 22 wherein land areas between said longitudinally extending channels and said circumferentially extending channels lie on a cylinder of revolution around said axis.

29. The container set forth in claim 22 wherein said longitudinally extending channels are uniformly circumferentially spaced around said axis, and each of said longitudinally extending channels is substantially co-planar with said axis.

30. The container set forth in claim 29 wherein said circumferentially extending channels are parallel to each other and perpendicular to said axis, and are uniformly axially spaced from each other.

31. A squeezable container sidewall of blow molded plastic construction, which includes:
an array of circumferentially spaced longitudinally extending channels that are substantially co-planar with an axis of said sidewall, and
an array of axially spaced circumferentially extending and circumferentially continuous channels intersecting said longitudinally extending channels, said sidewall adapted to be squeezed radially inwardly,
said longitudinally extending channels having radially inner portions that lie on an hourglass-shaped surface of revolution around said axis and that curves continuously between axially spaced ends of said sidewall.

32. The sidewall set forth in claim 31 wherein said hourglass-shaped surface of revolution has a waist about midway along said sidewall.

33. The sidewall set forth in claim 32 wherein said hourglass-shaped surface of revolution has a mid portion with a constant radius of curvature.

34. The sidewall set forth in claim 31 wherein land areas between said longitudinally extending channels and said circumferentially extending channels lie on a cylinder of revolution around said axis.

35. The sidewall set forth in claim 31 wherein said circumferentially extending channels have radial depths as a function of axial position along said sidewall in coordination with radial depth of said radially inner portions of said longitudinally extending channels.

36. The sidewall set forth in claim 35 wherein said circumferentially extending channels are concave at identical radii of curvature.

37. The sidewall set forth in claim 31 wherein said radially inner portions of said longitudinally extending channels lie radially inwardly of radially inner portions of said circumferentially extending channels.

38. The sidewall set forth in claim 31 wherein said sidewall is of monolayer or multilayer PET construction and has a sidewall thickness in the range of 0.005 to 0.03 inch.

39. A method of making a squeezable plastic container comprising:
forming a finish,
forming a shoulder extending from said finish,
forming a closed base, and
forming a sidewall connecting said shoulder to said base, the sidewall being of blow molded construction and having an array of circumferentially spaced longitudinally extending radially recessed channels, and an array of axially spaced circumferentially extending radially recessed channels intersecting said longitudinally extending channels, the sidewall adapted to be squeezed radially inwardly, the longitudinally extending channels having radially inner portions that lie on an hourglass-shaped surface of revolution around an axis of said sidewall.

40. A method of making a squeezable container sidewall of blow molded plastic construction comprising:
forming an array of circumferentially spaced longitudinally extending channels that are substantially co-planar with an axis of said sidewall, and
forming an array of axially spaced circumferentially extending and circumferentially continuous channels intersecting said longitudinally extending channels, the sidewall adapted to be squeezed radially inwardly, the longitudinally extending channels having radially inner portions that lie on an hourglass-shaped surface of revolution around said axis and that curves continuously between axially spaced ends of said sidewall.

41. A method of making a squeezable container of blow molded plastic construction comprising:
forming a finish,
forming a shoulder extending from said finish,
forming a closed base, and
forming a sidewall connecting said shoulder to said base, the sidewall having an axis and a plurality of axially and circumferentially spaced land areas with outer surfaces on a surface of revolution around said axis, said sidewall adapted to be squeezed radially inwardly, the land areas being separated from each other by a plurality of circumferentially spaced channels and a plurality of axially spaced channels that intersect said circumferentially spaced channels, the land areas being disposed in spaces between said channels, the circumferentially spaced channels having radially inner portions that lie on an hourglass-shaped surface of revolution around an axis of said sidewall.

* * * * *